(12) United States Patent
Ha

(10) Patent No.: US 11,752,963 B2
(45) Date of Patent: Sep. 12, 2023

(54) APPARATUS FOR OPERATING AIRBAG OF AUTONOMOUS VEHICLE AND CONTROL METHOD THEREOF

(71) Applicant: HYUNDAI MOBIS CO., LTD., Seoul (KR)

(72) Inventor: Min Kyu Ha, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/535,850

(22) Filed: Nov. 26, 2021

(65) Prior Publication Data

US 2022/0161749 A1 May 26, 2022

(30) Foreign Application Priority Data

Nov. 26, 2020 (KR) .......................... 10-2020-0161042

(51) Int. Cl.
*B60R 21/015* (2006.01)
*B60R 21/0134* (2006.01)
(Continued)

(52) U.S. Cl.
CPC ...... *B60R 21/01538* (2014.10); *B60R 21/015* (2013.01); *B60R 21/0134* (2013.01);
(Continued)

(58) Field of Classification Search
CPC .......... B60R 2021/23107; B60R 2021/01013; B60R 2021/01245; B60R 2021/01286;
(Continued)

(56) References Cited

U.S. PATENT DOCUMENTS

2004/0093141 A1* 5/2004 Rao ................... B60R 21/013
701/45
2011/0118943 A1* 5/2011 Han ................... B60R 21/00
356/28

(Continued)

FOREIGN PATENT DOCUMENTS

DE 4023109 A1 1/1992
DE 10246055 A1 4/2004
(Continued)

OTHER PUBLICATIONS

Examination Report dated Jan. 2, 2023 in the corresponding German Patent Application No. 102021130589.6.

*Primary Examiner* — Keith J Frisby
(74) *Attorney, Agent, or Firm* — NovoTechIP International PLLC

(57) ABSTRACT

An apparatus for operating an airbag of an autonomous vehicle may include: an interior image sensor configured to capture an interior image of a vehicle; an input unit configured to receive collision prediction information from an autonomous driving system and the interior image from the interior image sensor; an airbag module installed at the front and side of the interior of the vehicle, and configured to deploy an airbag; and an airbag control unit configured to estimate the sitting position and dynamic behavior of the passenger from the interior image inputted from the input unit, estimate a collision status from the collision prediction information, determine an airbag to be deployed and a time to deploy the airbag according to the sitting position, and then output a deployment signal to the airbag module.

11 Claims, 5 Drawing Sheets

(51) Int. Cl.
*B60R 21/231* (2011.01)
*B60R 21/01* (2006.01)
*B60R 21/013* (2006.01)

(52) U.S. Cl.
CPC .. *B60R 21/01542* (2014.10); *B60R 21/01554* (2014.10); *B60R 21/01558* (2014.10); *B60R 21/231* (2013.01); *B60R 2021/01013* (2013.01); *B60R 2021/01034* (2013.01); *B60R 2021/01231* (2013.01); *B60R 2021/01245* (2013.01); *B60R 2021/01286* (2013.01); *B60R 2021/01315* (2013.01); *B60R 2021/23107* (2013.01)

(58) Field of Classification Search
CPC .. B60R 2021/01315; B60R 2021/0032; B60R 2021/01231; B60R 2021/01034; B60R 21/01538; B60R 21/01554; B60R 21/01558; B60R 21/015; B60R 21/231; B60R 21/013; B60R 21/0134; B60R 21/0136; B60R 21/01542; B60N 2/14; B60N 2/143; B60N 2002/0272
USPC ............................................ 280/735; 701/45
See application file for complete search history.

(56) References Cited

U.S. PATENT DOCUMENTS

2016/0272141 A1* 9/2016 Ohmura ................. G01C 21/34
2020/0346607 A1* 11/2020 Kim ......................... B60N 2/14
2021/0086714 A1* 3/2021 Heinrich ........... B60R 21/01542

FOREIGN PATENT DOCUMENTS

| DE | 102004048129 A1 | | 4/2006 |
|----|-----------------|---|--------|
| DE | 102014210494 A1 | | 12/2015 |
| DE | 102017110105 A1 | | 11/2018 |
| JP | H11152009 A | * | 6/1999 |
| KR | 10-1655569 B1 | | 9/2016 |

* cited by examiner

APPARATUS FOR OPERATING AIRBAG OF AUTONOMOUS VEHICLE AND CONTROL METHOD THEREOF

CROSS-REFERENCE TO RELATED APPLICATIONS

This application claims priority from and the benefit of Korean Patent Application No. 10-2020-0161042, filed on Nov. 26, 2020, which is hereby incorporated by reference for all purposes as if set forth herein.

BACKGROUND OF THE INVENTION

1. Field of the Invention

Exemplary embodiments of the present disclosure relate to an apparatus for operating an airbag of an autonomous vehicle and a control method thereof, and more particularly, to an apparatus for operating an airbag of an autonomous vehicle, which determines a collision through a DAS sensor for autonomous driving in an autonomous vehicle, determines a dynamic position and seating condition of a passenger through an interior image sensor, selects an airbag to be deployed, decides a time to deploy the selected airbag, and operates the selected airbag, and a control method thereof.

2. Discussion of Related Art

In general, an airbag system of a vehicle refers to a safety device which rapidly inflates an airbag by injecting gas into the airbag according to a signal of a shock sensor in case of a vehicle collision, thereby protecting a passenger.

Such an airbag system is installed in a steering wheel, dashboard, seats, sidewalls and the like of the vehicle. In case of a collision of the vehicle, the airbag system is inflated toward the front or side of a passenger, and protects the passenger.

That is, a vehicle may include a DAB (Driver Airbag) which is deployed at the front of a driver seat, a PAB (Passenger Airbag) which is deployed at the front of a passenger seat, a CAB (Curtain Airbag) and SAB (Side Airbag) which are deployed on one side of a passenger so as to protect the passenger, and a KAB (Knee Airbag) for protecting the knee of a passenger.

Recently, autonomous vehicles have been developed, which can autonomously move without a driver's operation.

The autonomous vehicle senses the conditions of devices installed therein and the surroundings thereof by using a high-performance graphics processing device and high-tech sensors capable of recognizing surrounding objects, and travels while controlling the operations of the devices installed therein according to the sensing result.

Such high-tech sensors each measure the distance between objects like a human being, and sense a risk, thereby helping a driver to see all areas without a blind spot. The graphics processing device identifies the surroundings of the vehicle, on the basis of images captured through a plurality of cameras, and analyzes the images to assist the vehicle to safely travel.

For example, the autonomous vehicle may include a LiDAR, sound wave equipment, 3D cameras, a radar and the like, which are mounted therein.

In the autonomous vehicle which has such a configuration and does not need to be driven by a driver, the entire seats including a driver's seat are freely turned, and the angle of the back of each seat is adjusted up to 180 degrees through a tilting operation.

That is, a passenger may turn his/her seat to sit toward one side or to have a meeting with a passenger in a rear seat, while facing the passenger.

The related art of the present disclosure is disclosed in Korean Patent No. 10-1655569 published on Sep. 8, 2016, and entitled "Method and System for Protecting Passenger in Vehicle".

As such, the autonomous vehicle can travel even with a seat turned freely by a passenger. Therefore, when an airbag is operated only on the basis of the case in which a passenger is seated to face the traveling direction of the vehicle, an airbag may be unnecessarily deployed.

BRIEF SUMMARY OF THE INVENTION

Various embodiments are directed to an apparatus for operating an airbag of an autonomous vehicle, which determines a collision through a DAS sensor for autonomous driving in an autonomous vehicle, determines a dynamic position and seating condition of a passenger through an interior image sensor, selects an airbag to be deployed, decides a time to deploy the selected airbag, and operates the selected airbag, and a control method thereof.

In an embodiment, an apparatus for operating an airbag of an autonomous vehicle may include: an interior image sensor configured to capture an interior image of a vehicle; an input unit configured to receive collision prediction information from an autonomous driving system and the interior image from the interior image sensor; an airbag module installed at the front and side of the interior of the vehicle, and configured to deploy an airbag; and an airbag control unit configured to estimate the sitting position and dynamic behavior of the passenger from the interior image inputted from the input unit, estimate a collision status or condition from the collision prediction information, determine an airbag to be deployed and a time to deploy the airbag according to the sitting position, and then output a deployment signal to the airbag module.

The collision prediction information may include any one or more of a relative speed and time-to-collision with another vehicle around the autonomous vehicle.

The airbag module may include one or more of a DAB (Driver Air Bag), PAB (Passenger Air Bag), CAB (Curtain Air Bag), SAB (Side Air Bag) and KAB (Knee Air Bag).

The input unit may receive the collision prediction information from the autonomous driving system on the basis of vehicle CAN communication.

The airbag control unit may include: a sitting position estimation unit configured to estimate the sitting position of the passenger from the interior image; a collision status estimation unit configured to estimate a collision status for operating an airbag, from the collision prediction information; a dynamic behavior estimation unit configured to estimate the dynamic behavior of the passenger, caused by a collision, from the interior image; and an operation determination unit configured to determine a set of the airbags to be deployed and the point of time to deploy the airbag according to the sitting position, when the collision status estimation unit estimates that the collision occurred and the dynamic behavior estimation unit estimates that the dynamic behavior occurred, and output a deployment signal to the airbag module.

The sitting position estimation unit may estimate the sitting position of the passenger as a forward sitting position, a sideward sitting position or a backward sitting position.

The collision status estimation unit may estimate that the collision occurred, when the relative speed from the collision prediction information is equal to or higher than a speed threshold and the time-to-collision from the collision prediction information is equal to or smaller than a time-to-collision threshold.

The dynamic behavior estimation unit may estimate that the dynamic behavior occurred, when the displacement of the passengers' head is equal to or larger than a head displacement threshold and the displacement of the passenger's chest is equal to or larger than a chest displacement threshold, according to the sitting position of the passenger.

When the sitting position is a forward sitting position, the airbag control unit may output the deployment signal to any one or more of the DAB, the PAB, the SAB, the CAB and the KAB.

When the sitting position is a sideward sitting position, the airbag control unit may output the deployment signal to any one or more of the DAB, the PAB and the CAB.

When the sitting position is a backward sitting position, the airbag control unit may output the deployment signal to any one or more of the SAB and the CAB.

In an embodiment, a control method of an apparatus for operating an airbag of an autonomous vehicle may include: receiving, by an airbag control unit, collision prediction information from an autonomous driving system and an interior image from an interior image sensor, through an input unit; estimating, by the airbag control unit, the sitting position of a passenger from the interior image; estimating, by the airbag control unit, a collision status for operating an airbag, from the collision prediction information; estimating, by the airbag control unit, the dynamic behavior of the passenger, caused by a collision, from the interior image; and determining, by the airbag control unit, an airbag to be deployed and a time to deploy the airbag according to the sitting position, when the estimation result of the airbag control unit indicates that the collision occurred and the dynamic behavior occurred, and outputting a deployment signal to an airbag module.

The collision prediction information may include any one or more of a relative speed and time-to-collision with another vehicle around the autonomous vehicle.

In the estimating of the sitting position of the passenger, the airbag control unit may estimate the sitting position of the passenger as a forward sitting position, a sideward sitting position or a backward sitting position.

In the estimating of the collision status for operating the airbag, the airbag control unit may estimate that the collision occurred, when the relative speed from the collision prediction information is equal to or higher than a speed threshold and the time-to-collision from the collision prediction information is equal to or smaller than a collision-to-time threshold.

In the estimating of the dynamic behavior of the passenger, the airbag control unit may estimate that the dynamic behavior occurred, when the displacement of the passengers' head is equal to or larger than a head displacement threshold and the displacement of the passenger's chest is equal to or larger than a chest displacement threshold, according to the sitting position of the passenger.

In the outputting of the deployment signal to the airbag module, the airbag control unit may output the deployment signal to any one or more of a DAB, PAB, SAB, CAB and KAB, when the sitting position is a forward sitting position.

In the outputting of the deployment signal to the airbag module, the airbag control unit may output the deployment signal to any one or more of a DAB, PAB and CAB, when the sitting position is a sideward sitting position.

In the outputting of the deployment signal to the airbag module, the airbag control unit may output the deployment signal to any one or more of a SAB and CAB, when the sitting position is a backward sitting position.

In accordance with the embodiment of the present disclosure, the apparatus for operating an airbag of an autonomous vehicle and the control method thereof may select an airbag to be deployed and decide a time to deploy the airbag by determining a collision status through the DAS sensor for autonomous driving in the autonomous vehicle, and determining the dynamic position and sitting position of a passenger through the interior image sensor, and operate the airbag. Therefore, the apparatus and the control method may deploy the airbag on the basis of the free sitting position of the passenger, thereby not only preventing unnecessary airbag deployment, but also determining the collision status on the basis of the information inputted from the autonomous driving system. As a result, the control method may reduce the cost.

DETAILED DESCRIPTION OF THE INVENTION

Hereinafter, an apparatus for operating an airbag of an autonomous vehicle and a control method thereof will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
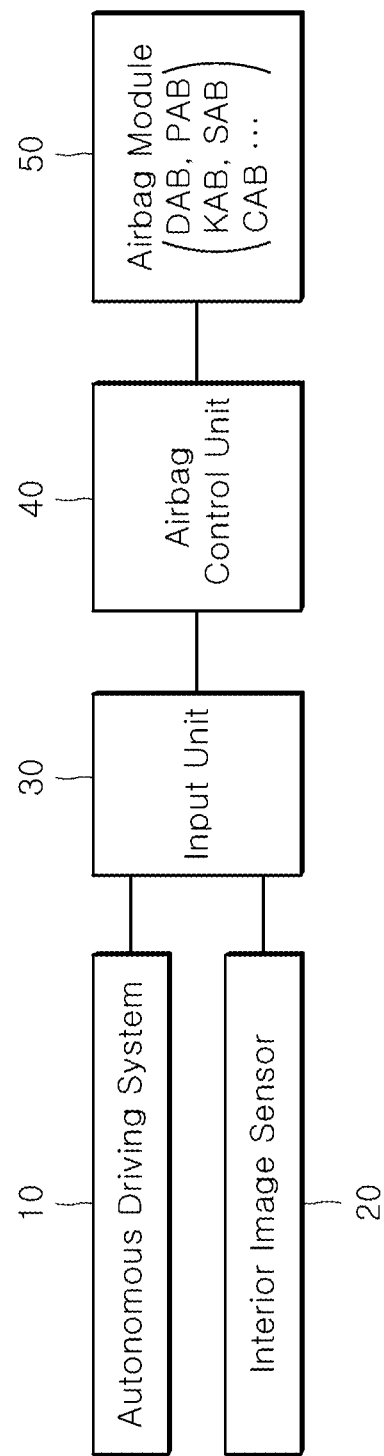
FIG. 1 is a block configuration diagram illustrating an apparatus for operating an airbag of an autonomous vehicle in accordance with an embodiment of the present disclosure.
Figure 2:
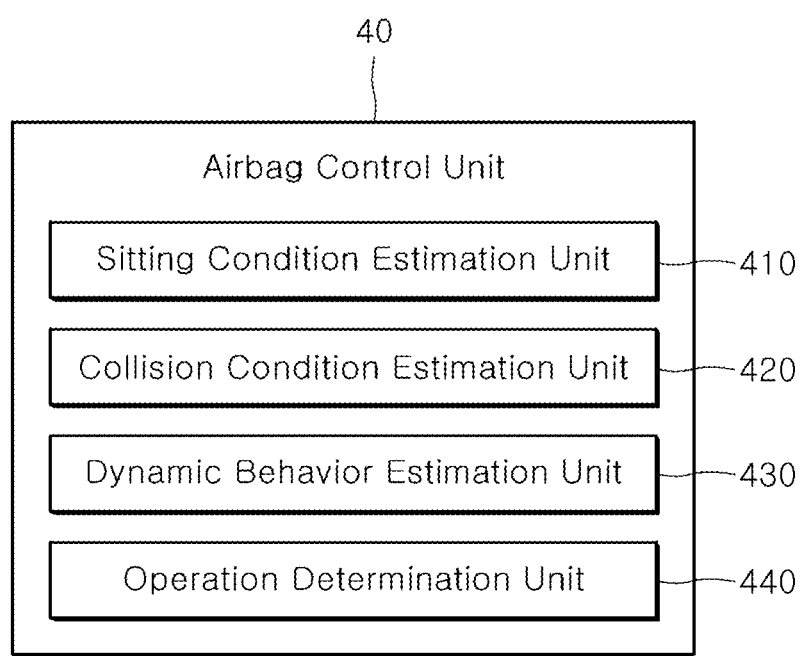
FIG. 2 is a detailed block configuration diagram illustrating an airbag control unit in the apparatus for operating an airbag of an autonomous vehicle in accordance with the embodiment of the present disclosure.
Figure 3A:
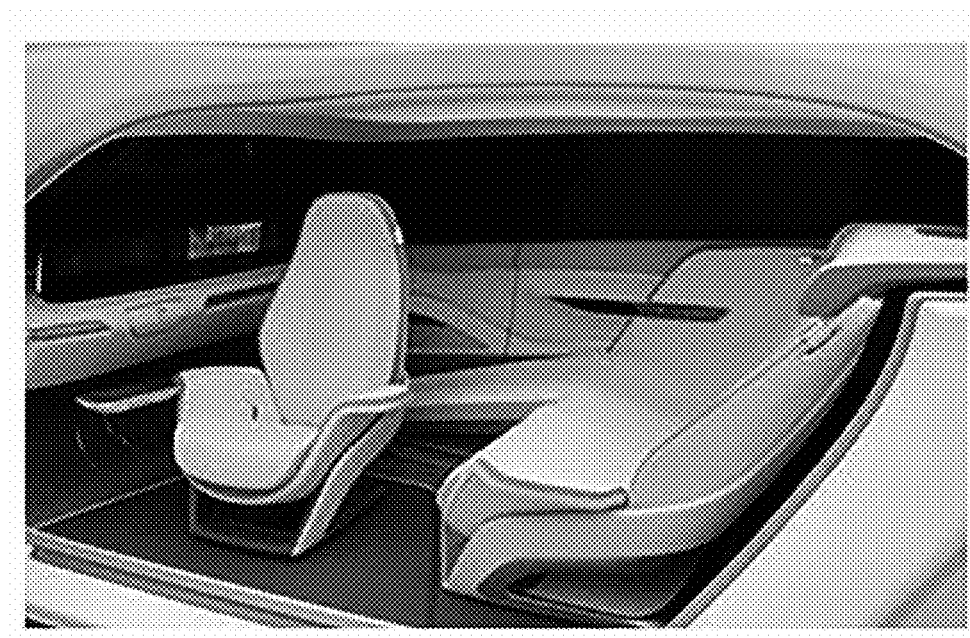
FIGS. 3A and 3B are photographs for describing sitting positions in the apparatus for operating an airbag of an autonomous vehicle in accordance with the embodiment of the present disclosure.
Figure 3B:
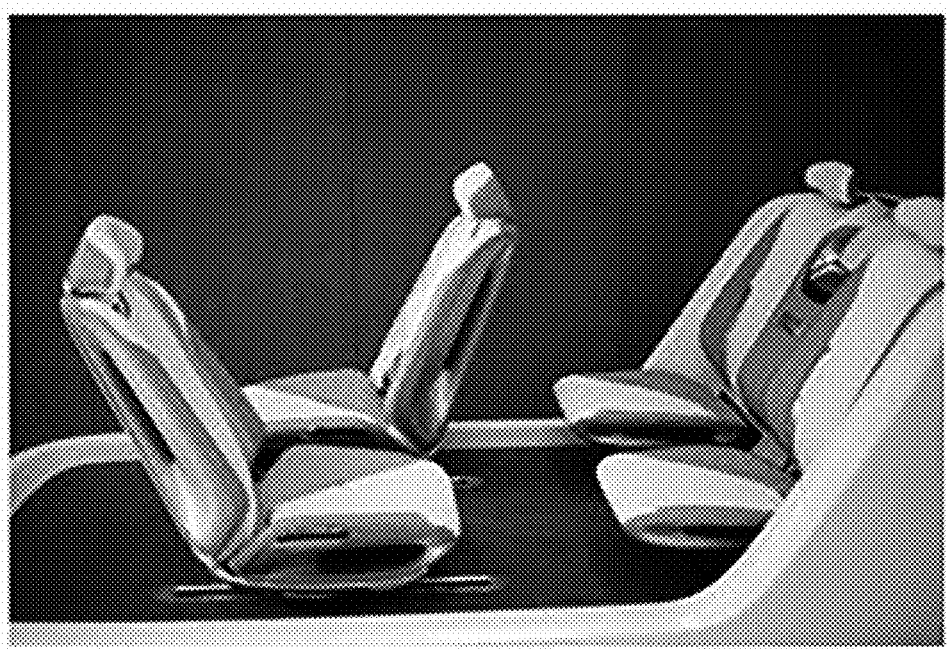

FIG. 1 is a block configuration diagram illustrating an apparatus for operating an airbag of an autonomous vehicle in accordance with an embodiment of the present disclosure, FIG. 2 is a detailed block configuration diagram illustrating an airbag control unit in the apparatus for operating an airbag of an autonomous vehicle in accordance with the embodiment of the present disclosure, and FIGS. 3A and 3B are photographs for describing sitting positions or conditions in the apparatus for operating an airbag of an autonomous vehicle in accordance with the embodiment of the present disclosure.

As illustrated in FIGS. 1 and 2, the apparatus for operating an airbag of an autonomous vehicle in accordance with the embodiment of the present disclosure may include an interior image sensor 20, an input unit 30, an airbag module 50 and an airbag control unit 40.

The interior image sensor 20 may capture an image of an interior of the vehicle, and provide the captured interior image to the airbag control unit 40 through the input unit 30.

The interior image sensor 20 may be employed to actively determine the sitting position and behavior of a passenger inside the vehicle, and include a camera and sensor which can sense the direction of the head or chest of the passenger.

The input unit 30 may receive collision prediction information from an autonomous driving system 10, receive the interior image from the interior image sensor 20, and provide the received information and image to the airbag control unit 40.

The input unit 30 may receive the collision prediction information from the autonomous driving system 10 via a vehicle controller area network (CAN).

The collision prediction information may include one or more of the relative speed and time-to-collision with another vehicle around the autonomous vehicle.

The airbag module 50 may be installed at the front and side of the interior of the vehicle, and deploy an airbag to protect a passenger.

The airbag module 50 may include one or more of a DAB (Driver Air Bag), PAB (Passenger Air Bag), CAB (Curtain Air Bag), SAB (Side Air Bag) and KAB (Knee Air Bag).

The airbag control unit 40 may estimate the sitting position and dynamic behavior of the passenger from the interior image inputted from the input unit 30, estimate a collision status or condition from the collision prediction information, determine an airbag to be deployed and a time to deploy the airbag, according to the sitting position, and output a deployment signal to the airbag module 50.

More specifically, as illustrated in FIG. 2, the airbag control unit 40 may include a sitting position estimation unit 410, a collision status estimation unit 420, a dynamic behavior estimation unit 430 and an operation determination unit 440.

The sitting position estimation unit 410 may estimate the sitting position of a passenger from the interior image on the basis of the displacement and speed of the face or body of the passenger.

The sitting position estimation unit 410 may estimate the sitting position of the passenger as a forward sitting position in which the passenger looks forward, a sideward sitting position in which the passenger turns the seat to sit toward one side as illustrated in FIG. 3A, and a backward sitting position in which the passenger turns the seat to face a passenger in a rear seat as illustrated in FIG. 3B.

The collision status estimation unit 420 may estimate a collision status for operating the airbag, from the collision prediction information.

Based on the relative speed and time-to-collision with another vehicle around the autonomous vehicle, inputted as the collision prediction information, the collision status estimation unit 420 may estimate that a collision occurred, when the relative speed is equal to or higher than a speed threshold, and the time-to-collision is equal to or smaller than a time-to-collision threshold.

The dynamic behavior estimation unit 430 may estimate the dynamic behavior of the passenger, caused by the collision, from the interior image.

That is, the dynamic behavior estimation unit 430 may calculate the displacement of the passenger's head and the displacement of the passenger's chest from the interior image, and estimate that the dynamic behavior occurred, when the head displacement is equal to or larger than a head displacement threshold and the chest displacement is equal to or larger than a chest displacement threshold.

The head displacement threshold and the chest displacement threshold may be differently set depending on the sitting position of the passenger. That is, the displacements and accelerations of the head and chest, caused by the collision, in case of the forward sitting position may be different from those of the head and chest, caused by the collision in case of the sideward sitting position. Therefore, the thresholds may be differently set depending on the sitting position.

When the collision status estimation unit 420 estimates that the collision occurred and the dynamic behavior estimation unit 430 estimates that the dynamic behavior occurred, the operation determination unit 440 may determine an airbag to be deployed and a time to deploy the airbag, according to the sitting position, and output a deployment signal to the airbag module 50.

As such, when the collision occurred and the dynamic behavior of the passenger occurred, the airbag control unit 40 may determine a set of the airbags to be deployed and the point of time to deploy the airbag, according to the sitting position, and output the deployment signal to the airbag module 50.

When the sitting position is the forward sitting position, the airbag control unit 40 may output the airbag deployment signal to any one or more of the DAB, the PAB, the SAB, the CAB and the KAB.

On the other hand, when the sitting position is the sideward sitting position, the airbag control unit 40 may output the airbag deployment signal to any one or more of the DAB, the PAB and the CAB, such that the DAB and the PAB can protect one side of a passenger, and the CAB can protect a passenger in a rear seat.

In this case, the SAB does not need to be deployed, because the seat was turned.

Furthermore, when the sitting position is the backward sitting position, the airbag control unit 40 may output the airbag deployment signal to any one or more of the SAB and the CAB, in order to protect one side of the passenger.

As described above, the apparatus for operating an airbag of an autonomous vehicle in accordance with the embodiment of the present disclosure may select an airbag to be deployed and decide a time to deploy the selected airbag by determining a collision status through the DAS sensor for autonomous driving in the autonomous vehicle, and determining the dynamic position and sitting position of a passenger through the interior image sensor, and operate the airbag. Therefore, the apparatus may deploy the airbag on the basis of the free sitting position of the passenger, thereby not only preventing unnecessary airbag deployment, but also determining the collision status on the basis of the information inputted from the autonomous driving system. As a result, the apparatus may reduce the cost.

Figure 4:
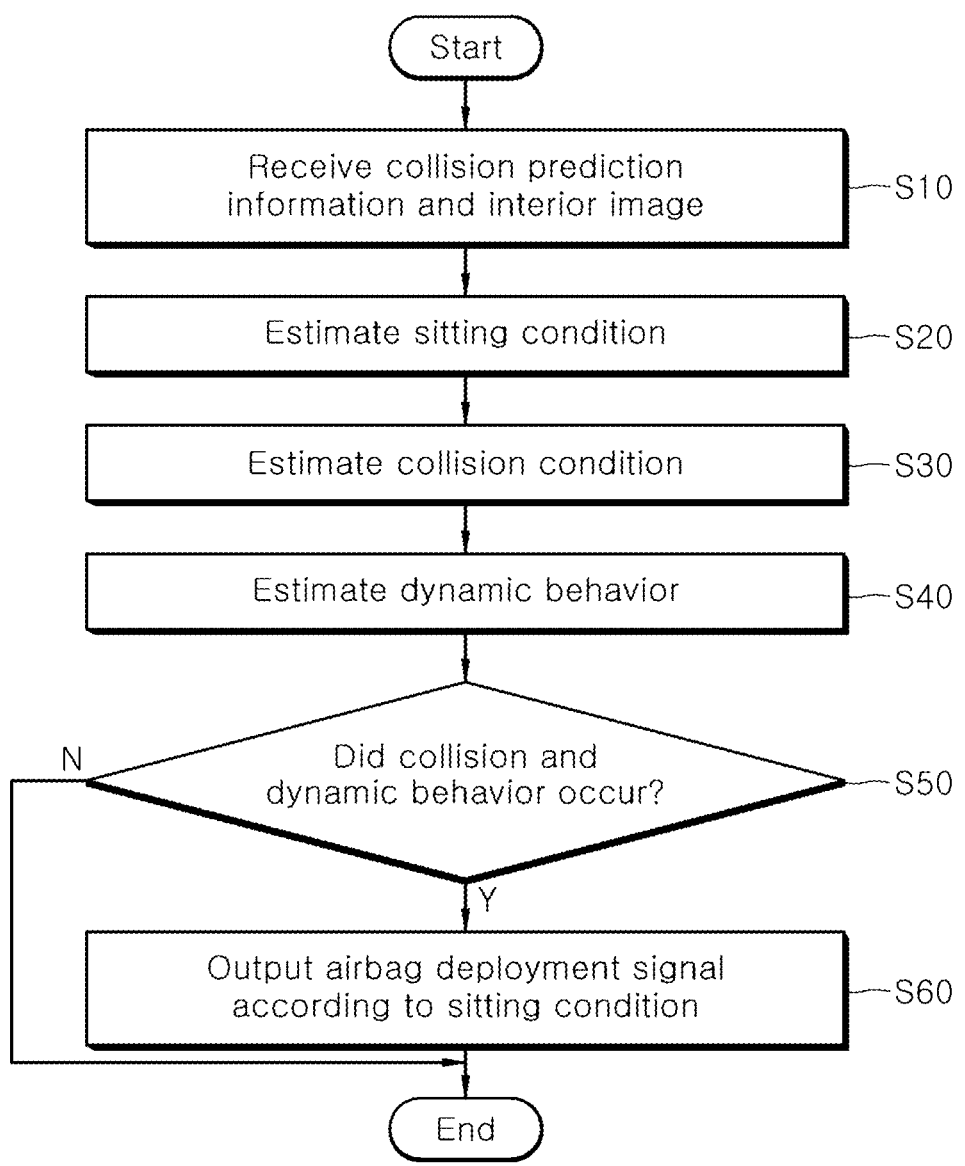
FIG. 4 is a flowchart for describing a control method of the apparatus for operating an airbag of an autonomous vehicle in accordance with the embodiment of the present disclosure.

FIG. 4 is a flowchart for describing a control method of the apparatus for operating an airbag of an autonomous vehicle in accordance with the embodiment of the present disclosure.

As illustrated in FIG. 4, the control method of the apparatus for operating an airbag of an autonomous vehicle in accordance with the embodiment of the present disclosure begins with step S10 in which the airbag control unit 40 receives collision prediction information from the autonomous driving system 10 and an interior image from the interior image sensor 20 through the input unit 30.

The interior image sensor 20 may be employed to actively determine the sitting position and behavior of a passenger inside the vehicle, and include a camera and sensor which can sense the direction of the head or chest of the passenger.

The collision prediction information may be received from the autonomous driving system 10 through the input unit 30 on the basis of vehicle CAN communication, and include any one or more of the relative speed and time-to-collision with another vehicle around the autonomous vehicle.

When the collision prediction information and the interior image are received in step S10, the airbag control unit 40 estimates the sitting position of the passenger from the interior image, on the basis of the displacement and speed of the face or body of the passenger, in step S20.

The airbag control unit 40 may estimate the sitting position of the passenger as a forward sitting position in which the passenger looks forward, a sideward sitting position in which the passenger turns the seat to sit toward one side as illustrated in FIG. 3A, and a backward sitting position in which the passenger turns the seat to face a passenger in a rear seat as illustrated in FIG. 3B.

The airbag control unit 40 estimates a collision status for operating an airbag from the received collision prediction information, on the basis of the relative speed and time-to-collision with another vehicle around the autonomous vehicle, in step S30.

The airbag control unit 40 may estimate that the collision occurred, when the relative speed is equal to or higher than a speed threshold and the time-to-collision is equal to or smaller than a time-to-collision threshold.

The airbag control unit 40 not only estimates the sitting position of the passenger from the interior image, but also estimates the dynamic behavior of the passenger, caused by a collision, in step S40.

That is, the airbag control unit 40 may calculate the displacement of the passenger's head and the displacement of the passenger's chest from the interior image, and estimate that the dynamic behavior occurred, when the head displacement is equal to or larger than a head displacement threshold and the chest displacement is equal to or larger than a chest displacement threshold.

The head displacement threshold and the chest displacement threshold may be differently set depending on the sitting position of the passenger. That is, the displacements and accelerations of the head and chest, caused by the collision, in case of the forward sitting position may be different from those of the head and chest, caused by the collision in case of the sideward sitting position. Therefore, the thresholds may be differently set depending on the sitting position.

After estimating the collision status in step S30 and estimating the dynamic behavior in step S40, the airbag control unit 40 determines whether a collision occurs and a dynamic behavior occurs, in step S50.

When the determination result in step S50 indicates that the collision status for operating the airbag was satisfied or the collision occurred and the dynamic behavior equal to or more than a threshold occurred, the airbag control unit 40 determines an airbag to be deployed and a time to deploy the airbag according to the sitting position, and outputs an airbag deployment signal to the airbag module 50, in step S60.

The airbag module 50 may include one or more of a DAB, PAB, CAB, SAB and KAB.

Thus, when the sitting position is the forward sitting position, the airbag control unit 40 may output the airbag deployment signal to any one or more of the DAB, the PAB, the SAB, the CAB and the KAB, On the other hand, when the sitting position is the sideward sitting position, the airbag control unit 40 may output the airbag deployment signal to any one or more of the DAB, the PAB and the CAB, such that the DAB and the PAB can protect one side of a passenger, and the CAB can protect a passenger in a rear seat.

In this case, the SAB does not need to be deployed, because the seat was turned.

Furthermore, when the sitting position is the backward sitting position, the airbag control unit 40 may output the airbag deployment signal to any one or more of the SAB and the CAB, in order to protect one side of the passenger.

As described above, the control method of the apparatus for operating an airbag of an autonomous vehicle in accordance with the embodiment of the present disclosure may select an airbag to be deployed and decide a time to deploy the airbag by determining a collision status through the DAS sensor for autonomous driving in the autonomous vehicle, and determining the dynamic position and sitting position of a passenger through the interior image sensor, and operate the airbag. Therefore, the control method may deploy the airbag on the basis of the free sitting position of the passenger, thereby not only preventing unnecessary airbag deployment, but also determining the collision status on the basis of the information inputted from the autonomous driving system. As a result, the control method may reduce the cost.

The embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device. The processor also includes a communication device, such as a computer, cellular phone, PDA (Personal Digital Assistant) and another device, which facilitates information communication between end users.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for operating an airbag of a vehicle, comprising:
    an interior image sensor configured to capture an image of an interior of a vehicle;
    an autonomous driving system configured to predict a collision of the vehicle and generate collision prediction information;

an airbag module comprising a plurality of airbags and configured to selectively deploy the plurality of airbags; and an airbag control unit configured to:
  estimate, based on the captured image, a sitting position of a passenger of the vehicle and a dynamic behavior of the passenger caused by the collision of the vehicle;
  estimate, based on the collision prediction information, a collision status of the vehicle;
  determine, based on the estimated sitting position, (i) a set of the airbags to be deployed, and (ii) a time to deploy the set of the airbags, the set of the airbags comprising at least one of the plurality of airbags; and
  transmit, to the airbag module, a deployment signal indicating the determined set of the air bags and the determined time to deploy the set of the air bags,
  wherein, to estimate the dynamic behavior of the passenger caused by the collision of the vehicle, the airbag control unit is further configured to:
    determine, based on the captured image, whether a displacement of the passenger's chest meets a chest displacement threshold; and
    in response to determining that the displacement of the passenger's chest meets the chest displacement threshold, determine that the dynamic behavior of the passenger has occurred,
    wherein the chest displacement threshold is varied depending on the estimated sitting position of the passenger.

2. The apparatus of claim 1, wherein the collision prediction information comprises at least one of a relative speed and a time-to-collision with another vehicle.

3. The apparatus of claim 1, wherein each of the plurality of airbags comprises a driver air bag (DAB), passenger air bag (PAB), curtain air bag (CAB), side air bag (SAB) or knee air bag (KAB).

4. The apparatus of claim 3, wherein, in response to estimating that the sitting position is a forward sitting position, the airbag control unit is configured to transmit the deployment signal to the airbag module to deploy one or more of the DAB, PAB, SAB, CAB and KAB.

5. The apparatus of claim 3, wherein, in response to estimating that the sitting position is a sideward sitting position, the airbag control unit is configured to transmit the deployment signal to the airbag module to deploy one or more of the DAB, PAB and CAB.

6. The apparatus of claim 3, wherein, in response to estimating that the sitting position is a backward sitting position, the airbag control unit is configured to transmit the deployment signal to the airbag module to deploy one or more of the SAB and CAB.

7. The apparatus of claim 1, wherein the autonomous driving system is configured to transmit the collision prediction information to the airbag control unit via a vehicle controller area network (CAN).

8. The apparatus of claim 1, wherein the airbag control unit comprises:
  a sitting position estimation unit configured to estimate, based on the captured image, the sitting position of the passenger;
  a collision status estimation unit configured to estimate, based on the collision prediction information, the collision status of the vehicle;
  a dynamic behavior estimation unit configured to determine whether based on the captured image, the dynamic behavior of the passenger has occurred; and
  an operation determination unit configured to:
    determine, based on the estimated sitting position, the set of the airbags to be deployed and the time to deploy the set of the airbags; and
    transmit the deployment signal to the airbag module when the collision status estimation unit indicates that the collision of the vehicle has occurred and the dynamic behavior estimation unit indicates that the dynamic behavior of the passenger has occurred.

9. The apparatus of claim 8, wherein the estimated sitting position of the passenger comprises a forward sitting position, a sideward sitting position or a backward sitting position.

10. The apparatus of claim 8, wherein:
  the collision prediction information comprises at least one of a relative speed and a time-to-collision with another vehicle, and
  the collision status estimation unit is configured to estimate that the collision has occurred when the relative speed meets a speed threshold or the time-to-collision meets a time-to-collision threshold.

11. The apparatus of claim 1, wherein the airbag control unit is further configured to:
  determine, based on the captured image, whether a displacement of the passenger's head meets a head displacement threshold; and
  in response to determining that (1) the displacement of the passenger's head meets the head displacement threshold and (2) the displacement of the passenger's chest meets the chest displacement threshold, determine that the dynamic behavior of the passenger has occurred.

* * * * *